United States Patent [19]

Darlington et al.

[11] 4,165,248
[45] Aug. 21, 1979

[54] METHOD OF JOINING FLUOROCARBON MEMBRANE SHEETS WITH QUATERNARY AMMONIUM COMPOUNDS

[75] Inventors: William B. Darlington; John D. Driskill; Donald W. Du Bois, all of Corpus Christi, Tex.

[73] Assignee: PPG Industries, Inc., Pittsburgh, Pa.

[21] Appl. No.: 858,754

[22] Filed: Dec. 8, 1977

Related U.S. Application Data

[63] Continuation-in-part of Ser. No. 746,271, Dec. 1, 1976, abandoned.

[51] Int. Cl.$^2$ .................................................. C09J 5/02
[52] U.S. Cl. .................................... 156/308; 156/309; 156/333; 156/313; 204/296; 260/567.6 M; 427/302; 427/407 F; 427/400; 428/420; 428/421; 428/422
[58] Field of Search ............... 156/307, 313, 308, 333, 156/309; 427/302, 407 F, 400; 428/420, 422, 421; 204/296; 260/567.6 M

[56] References Cited

U.S. PATENT DOCUMENTS

| | | | |
|---|---|---|---|
| 2,678,896 | 5/1954 | Dratler | 156/155 |
| 2,751,323 | 6/1956 | Pritchard et al. | 260/567.6 M |
| 2,786,780 | 3/1957 | Walles et al. | 427/400 |
| 2,788,306 | 4/1957 | Cox et al. | 156/308 |
| 2,827,426 | 3/1958 | Bodamer | 204/98 |
| 2,936,261 | 5/1960 | Coce | 156/309 |
| 3,041,317 | 6/1962 | Gibbs et al. | 260/79.3 |
| 3,282,875 | 11/1966 | Connolly et al. | 260/29.6 |
| 3,361,589 | 1/1966 | Lindsey | 156/308 |
| 3,692,569 | 9/1972 | Grot | 428/422 |
| 3,770,567 | 11/1973 | Grot | 428/422 |
| 3,784,399 | 1/1974 | Grot | 260/79.3 M |
| 3,852,135 | 12/1974 | Cook et al. | 156/94 |
| 3,853,720 | 12/1974 | Korach et al. | 204/98 |
| 3,998,751 | 12/1976 | Murray | 252/187 H |
| 4,065,366 | 12/1977 | Oda et al. | 204/98 |

*Primary Examiner*—John T. Goolkasian
*Assistant Examiner*—J. J. Gallagher
*Attorney, Agent, or Firm*—Richard M. Goldman

[57] ABSTRACT

Disclosed is a method of bonding two fluoropolymer membrane sheets. According to the disclosed method, a third sheet is contacted with a base and then interposed between the two membrane sheets. The two membrane sheets may also be contacted with a strong base. The resulting sandwich of three sheets is heated and pressed to effect the bond.

8 Claims, No Drawings

METHOD OF JOINING FLUOROCARBON MEMBRANE SHEETS WITH QUATERNARY AMMONIUM COMPOUNDS

CROSS REFERENCE TO RELATED APPLICATION

This is a continuation-in-part of our commonly assigned, copending U.S. application Ser. No. 746,271 filed Dec. 1, 1976 for *Method of Joining Membrane Sheets*, now abandoned.

DESCRIPTION OF THE INVENTION

Permionic membranes, that is, ion exchange membranes, find utility, inter alia, in electrolytic processes. One such process is the electrolysis of aqueous alkali metal chloride to yield chlorine, hydrogen, and aqueous alkali metal hydroxide. According to one method of carrying out this reaction, aqueous sodium chloride is fed into the anolyte chamber of an electrolytic cell as an electrical current is passed from an anode of the cell through a membrane to a cathode of the cell. Hydrogen is evolved at the cathode and a catholyte liquor of alkali metal hydroxide is recovered from the cell. According to one exemplification, the membrane interposed between the anolyte and the catholyte is a cation selective permionic membrane such that the catholyte liquor is substantially free of sodium chloride.

Microporous diaphragms, also called microporous membranes, find utility in electrolytic processes. For example, microporous membranes provide a long-lived barrier between the anolyte compartment and the catholyte compartment of an electrolytic cell. When a synthetic microporous membrane or diaphragm is used, a catholyte liquor containing alkali metal hydroxide and alkali metal chloride is obtained.

Electrolytic cells having membranes interposed between the anolyte liquor and the catholyte liquor may take various forms. One particularly economical geometry is characterized by fingered anodes interleaved between fingered cathodes. Interleaved electrodes are particularly desirable when a diaphragm is deposited on the cathode by hydraulic deposition of a fibrous material from a slurry. However, when the barrier is either a microporous synthetic diaphragm or a permionic membrane, formation thereof by the deposition of fibers from a slurry is generally not feasible. It is necessary to pre-form the barrier, i.e., the microporous diaphragm or the permionic membrane, into a suitable geometry for mounting on the cathode fingers.

Pre-forming of the microporous diaphragm or the permionic membrane may be accomplished by sewing and by various heat sealing techniques. Such heat sealing techniques, also referred to as welding techniques, are generally characterized by some deformation of the membrane. That is, the welding techniques are characterized by some wrinkling, tearing, and bubbling of the membrane. Additionally, such techniques may be characterized by some thermal decomposition of the membrane material.

The membranes herein contemplated are fluorocarbon membranes having active sites thereon. Typically active sites are provided by acid groups such as sulfonyl groups, carboxylic groups, phosphoric groups, and phosphonic groups, as well as derivatives thereof.

According to one exemplification of the invention, the membranes may be fabricated of fluorocarbons having sulfonyl groups thereon such as described in U.S. Pat. No. 3,282,875 to Connolly et al and U.S. Pat. No. 3,041,317 to Gibbs et al. Alternatively, the sheet may have one surface with sulfonyl groups in the $-(SO_2NH)_mQ$ form where Q is a cation chosen from H, $NH_4$, a cation of an alkali metal, or cation of an alkaline earth metal, and m is the valence of the cation Q, and the other surface of the sheet has sulfonyl groups in the $-(SO_3)_nMe$ form where Me is a cation chosen from H, a cation of an alkali metal, or a cation of an alkaline earth metal and n is the valence of the cation. When the cation is an alkali metal, it will most frequently be sodium or potassium. When the cation is an alkaline earth metal, it will most frequently be calcium or magnesium.

According to an alternative exemplification, the acid group is a carboxylic group, —COOH or a derivative thereof, as a —CN group, a —COF group, a —COOR$_1$ group where R$_1$ is a carboxylic group having from 1 to 10 carbon atoms, a —COOM group where M is an alkali metal, preferably Na or K, or a —CONR$_2$R$_3$ group where R$_2$ and R$_3$ are alkyl acid groups having from 1 to 10 carbon atoms each.

The method of this invention is also useful in forming lap welds or lap bonds of membranes prepared from fluoropolymers of the type having sulfonyl groups and carboxylic groups.

According to the method described herein, the sheets making up the membrane are "lap welded," that is, bonded or sealed at a lap or overlap. According to the disclosed method, the lap or overlap is of three layers, two of the layers being sheets to be joined and the third layer being an intermediate sheet treated with a strong base.

The strong base with which the intermediate sheet is treated is typically a material that exhibits basic characteristics in organic media. The preferred bases are the quaternary ammonium compounds such as quaternary ammonium salts and quaternary ammonium hydroxide.

According to the method of this invention, the sheets to be lap welded are overlayed so that the material of the intermediate sheet is a sulfonyl or carboxyl compound, and the sheets to be joined may be sulfonates, sulfonamides, or carboxylates. When any of the sheets are fabricated with an internal matrix, e.g., a fibrous rayon reinforcement, the sheet may be immersed in a strong oxidizing agent whereby to destroy the reinforcing sheet and enhance bonding.

Where the three sheets to be joined are all sulfonates, all three of them may be treated with a strong base as will be more fully described hereinafter.

Whenever the term "membrane" is used herein without further characterization, i.e., characterization as a permionic membrane or as a microporous diaphragm, both synthetic fluorocarbon polymer permionic membranes and synthetic fluorocarbon polymer microporous diaphragms are encompassed thereby.

DETAILED DESCRIPTION OF THE INVENTION

The method of this invention is useful in joining membrane sheets for use in forming complex shaped membranes, for example, as gloves to fit over the fingered electrodes of electrolytic cells. Thus, according to one exemplification, the method of this invention may be used to form membranes for use over the cathodes of an electrolytic cell intended for the electrolysis of alkali metal chloride, e.g., potassium or sodium chloride, to yield alkali metal hydroxide, e.g., potassium or sodium hydroxide, chlorine, and hydrogen. The membranes herein contemplated are fluorocarbon type membranes including permionic membranes, i.e., cation selective membranes which selectively allow the flow of cations therethrough and anion selective membranes which selectively allow the flow of anions therethrough, and microporous membranes, i.e., diaphragms having pore sizes of from about 0.05 micron to about 10 microns.

The method of this invention is particularly useful in joining membranes of high melting point fluorocarbon copolymers having acid ion exchange sites. One moiety of the copolymer is an olefinic fluorocarbon compound. Typical olefinic fluorocarbon compounds contemplated herein include vinyl fluoride, vinylidene fluoride, trifluoroethylene, perfluoroethylene, chlorotrifluoroethylene, hexafluoropropylene, perfluoro(alkyl vinyl ether) and mixtures thereof. The other moiety is provided a fluorocarbon having acid ion exchange sites. The acid ion exchange sites may be provided by sulfonyl groups, —$SO_3H$, carboxylic acid groups, —COOH, phosphoric sites, and phosphonic sites. The membrane sheets with which the method of this invention is particularly useful are sheets fabricated of a copolymer of an olefinic fluorocarbon compound and a fluorocarbon having pendant acid substituents chosen from the group consisting of sulfonyl groups, carboxylic acid groups, phosphoric groups, phosphonic groups, and derivatives thereof. Most frequently, the substituents are by sulfonyl groups, derivatives thereof, carboxylic acid groups, or derivatives thereof.

According to one exemplification of the invention, one or both surfaces of the fluorocarbon membranes herein contemplated may be a fluorocarbon copolymer having sulfonyl groups, —$(SO_3)_n$Me, where Me is a cation chosen from the group consisting of hydrogen, alkali metals, and alkaline earth metals and n is the valence of the cation. Useful alkaline earth metals include calcium and magnesium. However, alkali metals are preferred. The preferred alkali metals are sodium and potassium. The other surface of the membrane, or alternatively both surfaces of the membrane, may be a fluorocarbon copolymer having sulfonyl groups in the sulfonamide form, —$(SO_2NH)_m$Q, where Q is a cation chosen from the group consisting of hydrogen, ammonium ($NH_4$), alkali metals, and alkaline earth metals, and m is the valence of the cation. The preferred alkali metals are sodium and potassium. The preferred alkaline earth metals are calcium and magnesium.

The sulfonyl-containing moiety contains either the sulfonyl group, —$(SO_3)_n$Me, or the sulfonamide group, —$(SO_2NH)_m$Q. The structure of this moiety will be described with respect to the —$(SO_3)_n$Me form, although it is to be understood that the description is applicable to the —$(SO_2NH)_n$Q form. The sulfonyl-containing moiety is typically of the form:

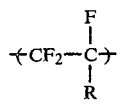

where R is chosen from the group consisting of A, —$(CF_2)_p$A, where p is a number between 2 and 8, —$(OCF_2CF_2)_q$A, where q is a number between 1 and 8,

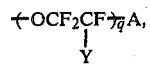

where q is a number between 1 and 8, and Y is chosen from the group consisting of F and $CF_3$, and

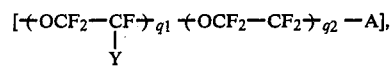

where $q_1$ and $q_2$ each are between 1 and 8, their sum, $q_1+q_2$, is between 1 and 8, and Y is chosen from the group consisting of $CF_3$ and F. A is chosen from the group consisting of —$(SO_3)_m$Me and —$(SO_2NH)_n$Q as described hereinabove and COOH. Most commonly, R will be A,

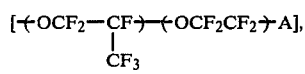

or [—$(OCF_2—CF_2)_2$—A].

Methods of synthesizing these polymers are described in U.S. Pat. No. 3,041,317 to Gibbs et al. for *Fluorocarbon Sulfonyl Fluorides;* U.S. Pat. No. 3,282,875 to Connolly et al. for *Fluorocarbon Vinyl Ether Polymers;* U.S. Pat. No. 3,301,893 to Putman et al. for *Fluorocarbon Ether Containing Sulfonyl Groups;* U.S. Pat. No. 3,624,053 to Gibbs et al. for *Trifluorovinyl Sulfonic Acid Polymers;* and U.S. Pat. No. 3,718,627 to Grot for *$CF_2$=CF $CF_2$ $CF_2SO_2F$ And Derivatives And Polymers Thereof.*

The polymers prepared as described in the above patents normally have an equivalent weight of from about 700 to about 1,500. Polymers having equivalent weights of less than about 700 are difficult to synthesize; and although such polymers are useful in the contemplated mode of this invention, they are generally of such low equivalent weight that other methods of joining may be advantageously used. Polymers having an equivalent weight of greater than about 1,500, while useful in the method of this invention, are of diminished selectivity and require rigorous treatment with the strong base and high temperatures in order to effect a satisfactory seal.

The fluorocarbon polymers having pendant acid groups thereon are formed into membranes, for example, as disclosed in U.S. Pat. No. 3,784,399 to Grot for *Films of Sulfonated Polymer Containing Sulfonyl Groups With One Surface In The Sulfonamide or Sulfonamide Salt Form And A Process For Preparing Such* and U.S. Pat. No. 3,909,378 to Walmsley for *Composite Cation Exchange Membrane And Use Thereof In Electrolysis Of An Alkali Metal Chloride.* The use of these membranes in electrolytic cells for the electrolysis of alkali metal chloride to yield alkali metal hydroxide, chlorine, and hydrogen, is illustrated in U.S. Pat. No. 3,948,737 to Cook et al. for *Process For Electrolysis Of Brine* and U.S. Pat. No. 3,773,634 to Stacey et al. for *Control Of Anolyte-Catholyte Concentrations In Membrane Cells.*

According to an alternative exemplification of the method of this invention, the cation selective permionic membrane is a copolymer having the structural units

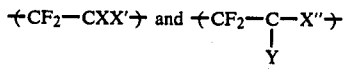

where X is —F, —Cl, —H, or CF$_3$, and X' and X" are —F, —Cl, —H, —CF$_3$ or —CF$_3$(CF$_2$)$_m$ where m is from 1 to 5. Y is —A, —$\phi$—A, R$_p$, —O—(CF$_2$)$_n$(R$_p$, R$_q$, R$_r$)A where R$_p$ is a group of the type (CF$_2$)$_a$(CXX')$_b$(CF$_2$)$_c$, R$_q$ is a group of the type (CF$_2$—O—CXX')$_d$, and R$_r$ is a group of the type (CXX'—O—CF$_2$)$_e$, $\phi$ is a phenyl group, n is a number from 0 to 1, and a, b, c, d, and e are numbers from 0 to 6. A is a carboxylic acid group, —COOH, or the reaction product of a carboxylic acid group with another group yielding a reaction product such as a —CN group, a —COF group, a —COOR$_1$ group, a —COOM group, or a —CONR$_2$R$_3$ group where R$_1$ is an alkyl group having from one to ten carbons, M is an alkali metal, and R$_2$ and R$_3$ are acid groups having alkyl groups of from 1 to 10 carbon atoms.

Most commonly, Y in the formula (CF$_2$—CYX")is:

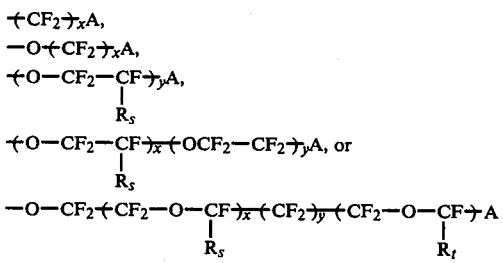

where x, y, and z are numbers from 1 to 10, R$_s$ and R$_t$ are perfluoro alkyl groups having from 1 to 10 carbon atoms.

One particularly desirable copolymer useful in preparing the membranes used in the practice of this invention is a copolymer of

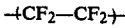

and

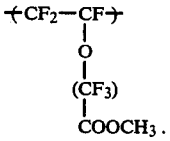

Another copolymer useful in preparing the membranes used in the practice of this invention is a copolymer of

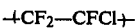

and

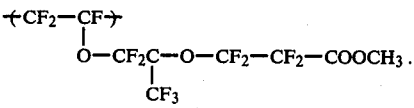

While still another polymer useful in carrying out the method of this invention is the copolymer of

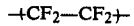

and

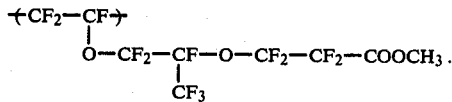

The method of this invention is particularly useful in bonding membranes of high equivalent weight polymer, e.g., above about 1,100 grams per gram equivalent. The base-treated intermediate sheet serves to reduce the temperature necessary to obtain satisfactory joints. The greater the equivalent weight, the greater is the bonding temperature reducing effect of the base-treated third sheet.

According to the method disclosed herein, a first fluorocarbon sheet is joined with a second fluorocarbon sheet to form an article, such as a shaped membrane, for example, in the shape of a cylinder or a glove, by joining, welding, or bonding the sheets at the edges. The joint between the first and second sheets of the membrane is a lap joint which may also be referred to as a lap weld or a lap seal. According to the method contemplated herein, a third polymer sheet, for example, a third sheet of a fluorocarbon membrane, is contacted with a strong base and the third sheet is then interposed between the first and second sheets. Additionally, the first and second sheets may also be contacted with the strong base. Thereafter, the three sheets are heated and compressed so as to form a lap joint.

The third polymer sheet may be fabricated of a fluorocarbon polymer, a chlorotrifluorocarbon polymer, a vinyl fluoride containing polymer, a vinylidene fluoride containing polymer, or a perfluorocarbon acid polymer such as is described hereinabove.

The third sheet may be a permionic material, that is, a sheet that is substantially impermeable to the passage of water. Alternatively, the third sheet may be a microporous material, that is, a material which is permeable to the passage of water.

The strong bases herein contemplated are materials that are soluble in those organic solvents which are capable of partially swelling the ion exchange membranes. Generally, the bases are nitrogen-containing organic compounds. Suitable nitrogen-containing organic compounds are quaternary ammonium compounds such as quaternary ammonium salts and quaternary ammonium hydroxide. Typical quaternary ammonium salts are quaternary ammonium chloride. The organic constituent of the quaternary ammonium compound may be methyl, ethyl, propyl, butyl, pentyl, or amyl. The quaternary ammonium compound may be tetramethyl ammonium hydroxide, tetraethyl ammonium hydroxide, tetrapropyl ammonium hydroxide, tetrabutyl ammonium hydroxide, tetrapentyl ammonium hydroxide, or tetra amyl ammonium hydroxide. The preferred quaternary ammonium compounds are tetrabutyl ammonium hydroxide, tetrapentyl ammonium hydroxide, tetra amyl ammonium hydroxide, and the salts thereof, e.g., tetrabutyl ammonium chloride and tetrapentyl ammonium chloride.

The solvents useful in carrying out the treatment of the third sheet according to the method of this invention are water and organic solvents that are compatible with the organic base as well as with the membrane.

Such compatible organic solvents include alcohols, especially the lower alcohols, for example, methyl alcohol, ethyl alcohol, the propyl alcohols, the butyl alcohols, the pentyl alcohols, the hexyl alcohols, the heptyl alcohols, and the octyl alcohols. Additionally, the method of this invention may be carried out with ketones, for example, methyl ethyl ketone, dimethyl ketone, and other ketones having from 3 to 8 carbon atoms. The method of this invention is also useful with aldehydes, especially those aldehydes having from 1 to about 8 carbon atoms. The method of this invention may also be carried out with liquid hydrocarbons including alkyl hydrocarbons, aromatic hydrocarbons, and olefinic hydrocarbons such as benzene, cumene, toluene, ethane, butane, pentane, hexane, heptane, octane, butylene, propylene, pentylene, and other organic solvents which may effect some swelling or solubilization or even activation of the surface of the ion exchange membrane material.

A solution containing from about 1 or 2 to about 5 or even 10 weight percent of the organic base in the solvent is typically utilized to treat the surface of the third sheet, i.e., the intermediate sheet. The sheets that are treated with the base are typically immersed in the liquid composition for a long enough time to reduce the flowing, softening, or melting temperature, e.g., from about 30 minutes to sixteen hours or more. The sheet is generally contacted with the liquid, e.g., by immersing at a temperature between the freezing point of the liquid and the reflux temperature.

Additionally, the first and the second, i.e., the two outer sheets, or only one of them, can be so treated. Preferably, all three of the sheets are so treated with the strong base. Thereafter, the third sheet is interposed between the first and second sheets so as to form a lap.

The resulting lap or lamination or sandwich of the three sheets is then heated to an elevated temperature and pressure. Typically, the temperature, pressure, and time of heat and pressure are long enough to seal the three sheets together to form a lap weld or lap joint. Temperature of the heating is typically from about 45° C. to the decomposition temperature and preferably from about 246° C. to about 271° C. Temperatures above about 575° C. are to be avoided as such temperatures may result in the thermal decomposition of the permionic membrane material. The pressure may be from atmospheric pressure to several tons per square inch but should be high enough to create contact between the intermediate or third sheet and the first and second sheets, while low enough to avoid tearing the membrane. The time of heat treatment should be such as to effect a complete seal, for example, from about 0.10 minute to about 5.0 minutes. Times from at least about 0.30 minute to about 2.0 minutes are preferred, although longer or shorter times may be used without deleterious effect.

According to one method of this invention, a duPont NAFION 227 membrane having a bi-layer construction of a copolymer of a perfluoroethylene and trifluorovinyl polyether sulfonic acid on one surface and a perfluoroethylene-trifluorovinyl polyether sulfonamide on the opposite side may be lap welded at the edges thereof to form a glove for use on a permionic membrane electrolytic cell. This may be accomplished by taking a third sheet of a 5-mil film of duPont NAFION ® 125 brand perfluoroethylene-trifluorovinyl polyether sulfonate having an equivalent weight of about 1,200, and immersing the duPont NAFION ® 125 permionic membrane sheet in a 2 percent solution of tetrabutyl ammonium hydroxide in methanol for approximately sixteen hours. Thereafter, the sheet is removed and placed between the two sheets of the poly(perfluoroethylene-trifluorovinyl ether sulfonate)-poly(ethylene-trifluoro polyether sulfonamide) bi-layer to form a tri-layer. The tri-layered lap may then be compressed to a pressure of 125 pounds per square inch and a temperature of about 100° C. to about 300° C. for from about 5 minutes to about 1 hour in order to form a lap joint or lap weld. The membrane sheets, now joined together at a lap weld, may then be used to cover a cathode finger of an electrolytic cell having a fingered cathode, such that the electrolytic cell may be utilized to obtain a substantially sodium chloride-free caustic soda cell liquor.

The two exterior sheets of the seal, that is, the first and third sheets, may also be treated with the tetrabutyl ammonium hydroxide solution as described above.

According to a still further exemplification of this invention, the sheets of ion exchange membrane forming the lap may be treated with a strong oxidant, for example, a hypochlorite salt such as sodium hypochlorite or chromic acid, in order to remove any thermally decomposable reinforcing matrices, e.g., rayon fibers, cellulose fibers, etc., before heating the membrane. Typically, the oxidation of the decomposable reinforcing matrix is carried out for a period of from 5 minutes or more to 10 to 12 hours, depending on the temperature, the oxidant concentration, and the structure of the membrane. In this way, discoloration and deformation may be reduced.

The following example is illustrative.

Example

A series of tests were carried out to determine the effect of an intermediate tetrabutyl ammonium hydroxide treated perfluoroethylene-trifluorovinyl polyether sulfonic acid sheet on the strength of the bond between a pair of perfluoroethylene-trifluorovinyl polyether sulfonic acid sheets as described below.

The outer sheets were 12 mil thick sheets fabricated of a duPont NAFION ® 390 permionic membrane. The individual membrane sheets were formed of a 4 mil layer of 1,100 equivalent weight perfluoroethylene-trifluorovinyl polyether sulfonic acid, an intermediate 6.5 mil thick layer of T-900 Teflon ®-rayon fabric, and a 1.5 mil thick layer of 1,500 grams equivalent weight perfluoroethylene-trifluorovinyl polyether sulfonic acid.

The intermediate sheets were 5 mil films of duPont NAFION ® 125 permionic membrane fabricated of 1,200 gram equivalent weight perfluoroethylene-trifluorovinyl polyether sulfonic acid.

In each test the sheets were immersed in a solution prepared from 10 milliliters of tetrabutyl ammonium hydroxide in 20 milliliters of methyl alcohol for 120 minutes at a temperature of approximately 27° C.

The sheets were then removed from the solution, overlaid to provide a lap of ¼ inch by 6 inches, and placed in the heat sealer. The heat sealer had two 6 inch by ¼ inch steel heating elements driven together by compressed air. In each of the tests, the steel heating elements remained together at a pressure of from about 110 to about 125 pounds per square inch and at the times and temperatures shown in Table I below.

TABLE I

| Intermediate Sheet | Yes | No | No | Yes | No |
|---|---|---|---|---|---|
| Temperature | 246° C. | 246° C. | 246° C. | 271° C. | 271° C. |
| Time | 60 sec. | 60 sec. | 120 sec. | 120 sec. | 120 sec. |
| Quality of Seal | Good[1] | Fair | Fair | Good | Fair[1] |

[1]Two tests

While the invention has been described with reference to certain particular specific details and preferred exemplifications, it is not intended thereby to limit the scope of this invention except insofar as the details are recited in the appended claims.

We claim:

1. A method of bonding first and second permionic membrane sheets fabricated of fluorocarbon polymers having pendant acid groups chosen from the group consisting of sulfonyl groups, carboxylic acid groups, phosphoric groups, phosphonic groups, and derivatives thereof, which method comprises the steps of:
   contacting a strip fabricated of fluorocarbon polymers having pendant acid groups chosen from the group consisting of sulfonyl groups, carboxylic acid groups, phosphoric groups, phosphonic groups, and derivatives thereof, with a quaternary ammonium compound chosen from the group consisting of quaternary ammonium hydroxide and quaternary ammonium salts, and having organic constituents chosen from the group consisting of methyl, ethyl, propyl, butyl, pentyl, and amyl groups;
   forming a lap of said contacted first sheet, said second sheet, and said strip, the strip being interposed between the first and second sheets; and
   heating said lap to above about 246° C. while imposing an elevated pressure thereon whereby to effect a bond between said first sheet, said strip, and said second sheet.

2. A method of bonding first and second permionic membrane sheets fabricated of fluorocarbon polymers having pendant carboxylic acid groups, which method comprises the steps of:
   contacting a strip fabricated of fluorocarbon polymers having pendant carboxylic groups with a quaternary ammonium compound chosen from the group consisting of quaternary ammonium hydroxide and quaternary ammonium salts, and having organic constituents chosen from the group consisting of methyl, ethyl, propyl, butyl, pentyl, and amyl groups;
   forming a lap of said first sheet, said second sheet, and said contacted strip, the strip being interposed between the first and second sheets; and
   heating said lap to above about 246° C. while imposing an elevated pressure thereon whereby to effect a bond between said first sheet, said strip, and said second sheet.

3. A method of bonding first and second sheets fabricated of fluorocarbon polymers having pendant acid groups comprising the steps of:
   contacting a third fluorocarbon polymer membrane sheet formed of a fluorocarbon polymer having pendant acid groups with a quaternary ammonium compound base chosen from the group consisting of quaternary ammonium hydroxide and quaternary ammonium salts, and having organic constituents chosen from the group consisting of methyl, ethyl, propyl, butyl, pentyl, and amyl groups;
   interposing the third contacted fluorocarbon polymer membrane sheet between the first and second fluorocarbon polymer membrane sheets; and
   heating and compressing the three sheets sufficiently to bond them together.

4. The method of claim 1 wherein said pendant acid groups are chosen from the group consisting of sulfonyl groups, carboxylic acid groups, phosphoric groups, phosphonic groups, and derivatives thereof.

5. The method of claim 4 wherein said pendant acid groups are carboxylic groups.

6. The method of claim 1 wherein at least one of said sheets comprises a fluorocarbon polymer having pendant sulfonic groups and pendant sulfonamide groups thereon.

7. The method of claim 1 wherein said base is in an organic solvent.

8. The method of claim 1 comprising heating the three sheets to between 246° C. and 271° C.

* * * * *